United States Patent
Mazzocchi et al.

(10) Patent No.: US 7,914,039 B2
(45) Date of Patent: Mar. 29, 2011

(54) INTERLOCKING ONE PIECE MOLDED PASSENGER AIR BAG CHUTE

(75) Inventors: Nicholas A. Mazzocchi, Canton, MI (US); Lisandro Trevino, Ann Arbor, MI (US); Raymond E. Kalisz, Livonia, MI (US); Kenneth J. Kwasnik, Shelby Township, MI (US); Wan-San Chiu, Ann Arbor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 124 days.

(21) Appl. No.: 12/404,409

(22) Filed: Mar. 16, 2009

(65) Prior Publication Data

US 2010/0230938 A1    Sep. 16, 2010

(51) Int. Cl.
*B60R 21/205* (2011.01)
(52) U.S. Cl. .............. 280/732; 280/728.2; 280/728.3
(58) Field of Classification Search ........... 280/728.3, 280/728.2, 732
See application file for complete search history.

(56) References Cited

U.S. PATENT DOCUMENTS

| | | | |
|---|---|---|---|
| 6,457,744 B1 * | 10/2002 | Tonooka | 280/732 |
| 6,644,685 B2 | 11/2003 | Sun et al. | |
| 6,709,007 B2 | 3/2004 | Gray et al. | |
| 6,716,519 B2 | 4/2004 | Ueno et al. | |
| 6,932,381 B2 | 8/2005 | Cowelchuk | |
| 7,216,892 B2 * | 5/2007 | Baumbach et al. | 280/728.2 |
| 7,237,797 B2 | 7/2007 | Dailey et al. | |
| 7,770,915 B2 * | 8/2010 | Nishijima et al. | 280/728.3 |
| 2006/0214399 A1 * | 9/2006 | Okamoto et al. | 280/728.3 |
| 2007/0187930 A1 * | 8/2007 | Chitteti et al. | 280/728.2 |

FOREIGN PATENT DOCUMENTS

JP    2007216506 A  *  8/2007
JP    2008149810 A  *  7/2008

* cited by examiner

*Primary Examiner* — Paul N Dickson
*Assistant Examiner* — Keith Frisby
(74) *Attorney, Agent, or Firm* — MacMillan, Sobanski & Todd, LLC; Mark L. Mollon

(57) ABSTRACT

An integrated air bag chute structure that provides means for providing automatic interlocking attachment of the chute to the substrate of an instrument panel. By inserting the air bag chute into a substrate aperture and utilizing slots, depressions and notches formed in the chute structure beneath a surrounding flange, the aperture edges are captured and retained to thereby lock the chute in place.

11 Claims, 3 Drawing Sheets

INTERLOCKING ONE PIECE MOLDED PASSENGER AIR BAG CHUTE

CROSS-REFERENCE TO RELATED APPLICATIONS

This application is related to the commonly assigned application filed contemporaneously herewith and entitled: AIR BAG CHUTE SEAL, U.S. Ser. No. 12/404,410.

BACKGROUND OF THE INVENTION

1. Field of the Invention

This invention relates to the field of air bag deployment systems for an automotive vehicle and more particularly to the area of an air bag chute structure.

2. Description of the Related Art

In this technology field, there have been several methods of providing attachment of a passenger air bag chute to a vehicle interior panel. In cases where there is a foam-in-place process used to provide the foam layer between the air bag deployment door of a chute that is mounted on the instrument panel substrate and the outer skin layer, a seal element is typically employed to prevent leakage of the foam material during the process. In addition, the air bag chute is typically clamped in place to the instrument panel substrate by the use of screws or bolts.

U.S. Pat. No. 6,644,685 describes an air bag chute with a base reinforcement portion that surrounds a deployment door. When foam is injected as a liquid between the instrument panel substrate and the outer skin, a gasket or adhesive tape is described as being used to prevent leakage of the liquid foam from gaps formed between the reinforcement portion and the substrate. In the disclosed configuration, the adhesive tape layer is placed over the door panel and has its hinge edge clamped against the chute support structure with fasteners such as bolts. The entire air bag chute structure is attached to the instrument panel substrate by the use of fasteners which extend through an outer compression frame, the adhesive layer, the instrument panel substrate and the upper flange of the air bag support frame.

U.S. Pat. No. 6,709,007 describes an embodiment of an air bag deployment chute attached to the substrate of an instrument panel with bolts. A layer of masking tape or a die cut polymer with an adhesive on each surface is applied between the reinforcing ring and the instrument panel substrate to prevent the foam from penetrating between those elements.

U.S. Pat. No. 6,716,519 shows the use of a urethane sealing layer to prevent foam migration through mating lower surface of an air bag chute flange against the upper surface of an instrument panel substrate. The air bag chute is an integrated molding that attaches to the instrument panel substrate in a generally flush manner.

U.S. Pat. No. 7,237,797 shows the use of a masking tape sealing layer to prevent foam migration through mating surfaces on the instrument panel. The tape is folded over the edge of the door panel and the air bag chute frame to keep the door in the closed position. Studs and nuts are used to attach the air bag chute to the instrument panel substrate.

SUMMARY OF THE INVENTION

The inventive concept is directed to an improved method and apparatus, for use in an air bag deployment system that includes an air bag deployment chute formed to have an encircling flange member that seals itself against the upper surface of an instrument panel substrate to prevent foam migration during the foam-in-place injection process. The air bag chute structure is configured with a plurality of elements that interlock with the edge of the substrate aperture during installation of the chute into the aperture. The interlocking elements serve to retain the chute in place. One interlocking element is an elongated single tab (or series of tabs) that defines a slot beneath the flange on a first side wall of the chute skirt to capture the edge of an air bag aperture formed in the instrument panel substrate when the chute structure is inserted into the aperture. A series of indentations on the opposite side wall of the air bag chute skirt reside below the flange and are disposed to catch corresponding tab elements protruding from the instrument panel aperture as the air bag chute becomes fully inserted into the aperture. Flexible gussets that function to support the flange on the other two side walls of the air bag chute skirt contain notches that engage the instrument panel substrate when it is fully engaged into the aperture.

The inventive concept includes an integrated air bag deployment chute structure with a support base for attachment to an opening in a vehicle interior substrate. The support base is configured with a flange that surrounds a door support panel and overlays the opening in the vehicle interior substrate when inserted therein. The flange has outer edges that are flexible and tapered to lie flat against the substrate surface to both seal the interface and minimize interference to the flow of foam during the foam-in-place injection process employed after the chute structure is inserted into the aperture of an instrument panel substrate and locked in place.

A rectangular air bag chute skirt extends downward from the support base. The chute side walls are made up of two opposing major walls that run parallel with each other and two opposing minor walls that join the two major walls. The major walls are also parallel to the hinge and leading edge of a door support panel defined in the upper portion adjacent to the flange. The four walls form a skirt for surrounding a separate air bag container and define the path for deployment of the air bag from the air bag container. In the described embodiment, the door support panel is generally co-planar with the support base flange and has defined door edges formed on three sides by pre-weakened molding or scoring. The door support edges remain attached to the support base prior to deployment of the air bag. A door support hinge element is formed to extend along one side of the defined door. In the described embodiment, the entire upper surface of the air bag deployment chute that includes the door support panel and the flange is continuously closed without gaps or openings so that there is no potential path for foam leakage during the foam-in-place injection process.

The chute side walls on the lower portion of chute form a rectangular cross-sectional chute having first and second generally parallel and opposed major walls that are longer than third and fourth generally parallel and opposed minor walls oriented generally perpendicular to the first and second walls.

On the outer surface of a first side wall and below the flange, a single elongated tab (or a plurality of short tabs) is located to extend outwardly from the wall and define a corresponding slot between the tab and the underside of the flange. The slot is arranged in a line that corresponds to the edge of the substrate aperture into which the structure will be mounted. When the chute is inserted into the aperture from the upper side of the instrument panel substrate, the slot becomes engaged with the edge of the aperture and holds the tapered edge of the flange adjacent thereto, against the upper surface of the substrate.

The third and fourth side side walls contain gussets or braces to provide support to the flange extending above those walls. The gussets are of the same flexible material as the remainder of the integrally molded chute and because they extend beyond the substrate aperture, are slightly deformed during the insertion process. Notches are provided in the upper portions of the gussets to accommodate the side edges of the aperture in the instrument panel substrate. When the chute is fully inserted into the aperture, the gussets resume their original shapes and the notches capture and hold the chute and the flange in place for maintaining the seal.

The second skirt wall contains a series of individual notches or depressions that extend substantially the length of the wall beneath the flange and are sized to accept tab like extensions from the aperture edge, when the chute is fully inserted into the aperture. These depressions, along with the notches in the side gussets, retain the three sides of the chute and maintain the seal between the flange edges extending from those three sides and the upper surface of the instrument panel substrate.

Therefore, it is an object of the inventive concept to provide an improved air bag deployment chute that is held in place within the instrument panel of an automotive vehicle by merely inserting the chute into a corresponding aperture in the substrate.

It is another object of the inventive concept to provide an improved air bag chute that is an integrated structure with a surrounding flange having a tapered edge that seals against the upper surface of the instrument panel to which the air bag chute is mounted prior to performing a foam-in-place process and an attachment configuration that maintains the seal without the need for additional components such as fasteners.

It is a further object of the inventive concept to provide an air bag chute structure used in an air bag deployment system of an automotive vehicle wherein the structure is configured to be installed in an aperture of an instrument panel substrate; the structure contains an upper portion with a flange surrounding the structure; the flange is formed to engage the upper surface of the substrate surrounding the aperture when the structure is inserted into the aperture; and retaining slots and notches are provided in the lower portion of the chute structure to engage and interlock with the edges of the aperture formed in the instrument panel substrate during its insertion therein and to permanently retain the chute in the aperture.

It is a still further object of the inventive concept to provide a method of retaining an air bag deployment chute structure in an aperture formed in the substrate of an automotive instrument panel as a result of inserting the chute into the aperture from the upper surface side of the substrate and subjecting the chute to downward pressure to engage the retaining mechanism. The steps include providing the chute structure with a flange that extends around a defined deployment door support panel sufficiently to exceed the dimensions of the aperture; providing the outer side skirt walls of the chute below the flange with notches and slots that will engage the edges of the aperture when inserted into the aperture; insert the air bag deployment chute structure into the aperture in the substrate so that the flange engages the upper surface of the substrate; and fully depress the flange against the substrate until all the notches and slots engage the edges of the aperture.

It is a still further object of the inventive concept to provide an air bag chute structure for use in an instrument panel air bag deployment system of an automotive vehicle, comprising: a generally planer deployment door support panel portion integrated in the structure and defined by a plurality of pre-weakened edges and a flexible hinge with an upper surface and a lower surface; a generally planar flange member portion with an upper surface and a lower surface extending from the area surrounding the door support panel; an air bag chute portion extending from an area adjacent the lower surfaces at a junction of the door panel and the flange for insertion into a corresponding aperture formed in the substrate of an instrument panel; a single elongated tab (or series of tabs) that defines a slot (or series of aligned slots) beneath the flange along the hinge side of the chute portion between the lower surface of the flange and having a slot width that is substantially equal to the thickness of the aperture edge to engage the aperture edge when the chute is inserted into the aperture; and a plurality of notches disposed below the lower surface of the flange on the other sides of the chute portion to engage portions of the aperture edge when the air bag chute is fully inserted into the aperture.

A more complete description of an embodiment of the inventive concept is presented below.

DETAILED DESCRIPTION OF THE INVENTION

Figure 1:
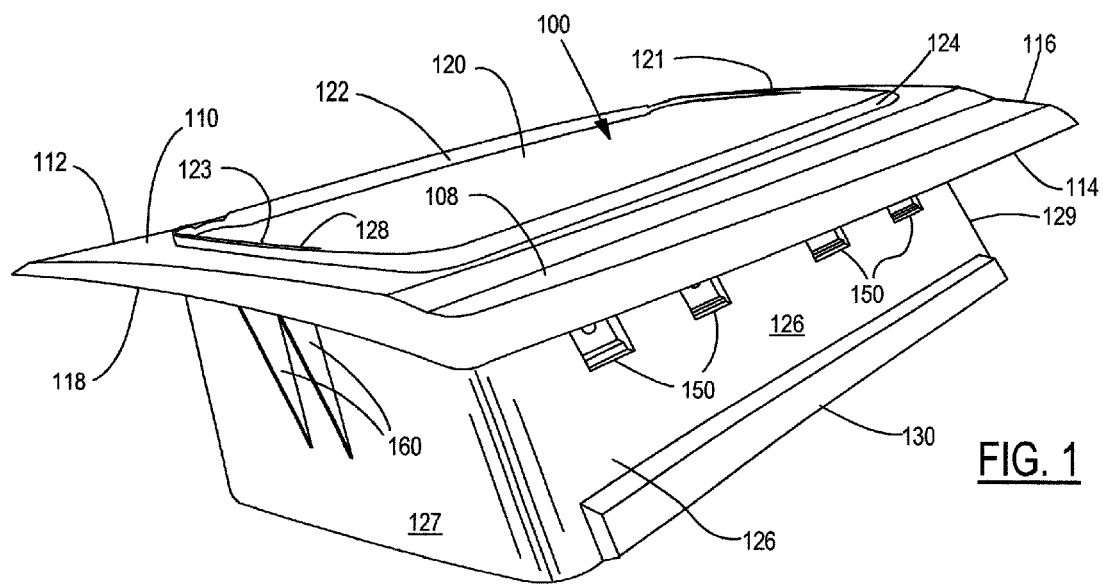
FIG. 1 is a perspective view of the air bag chute structure of the present invention.

The perspective view of the air bag chute 100 of the present invention is shown in FIG. 1 with the forward or windshield side in the foreground and the rear or passenger side in the background. The air bag chute 100 is embodied as a unitary structure 110 that is molded of a plastic material preferably having some flexibility to prevent fracturing during air bag deployment in all expected temperatures of operation. The upper portion of the structure 110 includes a door support panel 120 that is defined by a pre-weakened seam 122 at the outermost (initially rupturing) edge and a pair of pre-weakened seams on side edges 121 and 123. A hinge 124 defines the fourth side of the door support panel 120.

When installed on the instrument panel of a passenger vehicle, the hinge is closest to the windshield of the vehicle and the initially rupturable seam 122 is located closest to the passenger seating position.

The air bag chute structure 100 is formed as a one piece molding of a flexible material such as Dexflex™ or other material that exhibits equivalent or superior ductility at very cold temperatures at least to −30° C. and good toughness at high temperatures at least to 90° C. Materials such as TPO (Thermoplastic Olefin), TPE (Thermoplastic Elastomer) or TEO (Thermoplastic Elastomer Olefin) could be substituted.

In the shown embodiment, door support panel 120 is surrounded by a mounting flange 108 that is generally rectangular in shape and has flexible and tapered edges 112, 114, 116 and 118 of mounting flange 108. The tapered edges are formed to be biased slightly downward so that when installed in the aperture of an instrument panel substrate 50, the flange will provide a compression seal with respect to the substrate surface.

Figure 2:
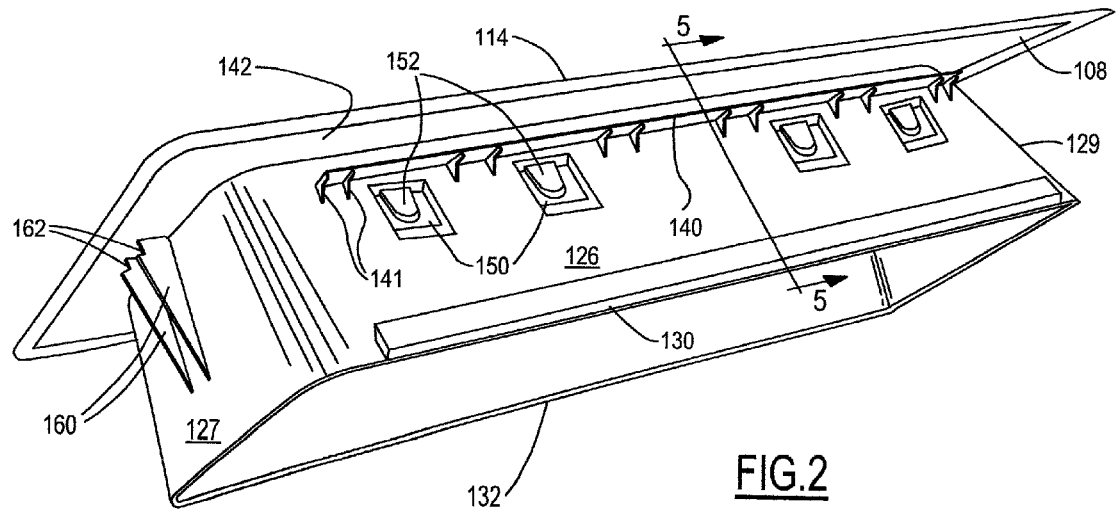
FIG. 2 is a perspective view of the same air bag chute shown in FIG. 1, but rotated upwards to reveal the detail of the sidewall below the door support panel hinge.
Figure 3:
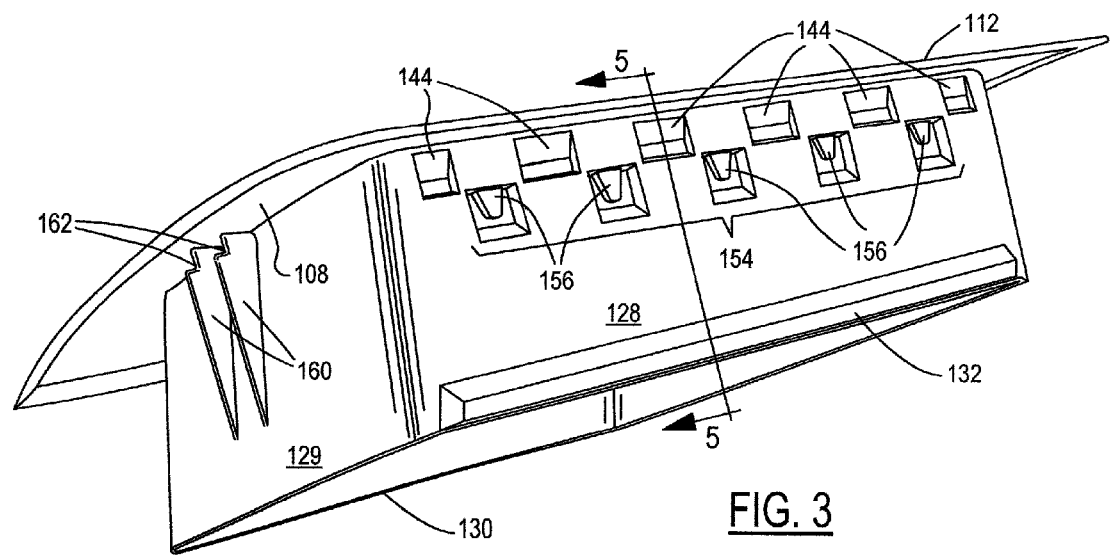
FIG. 3 is a perspective view of the same air bag chute shown in FIG. 1, viewed from the opposite side to reveal the detail of the sidewall below the door support panel opening edge.

A plurality of windows 150 and 154 with retainer tabs 152 and 156 are located on lower chute side walls 126 and 128, and reinforcement bars 130 and 132 are located at the lowest edge of the chute walls 126 and 128 (FIGS. 2 and 3). Retainer tabs 152 and 156 function to contact hooks extending through the windows 150 and 154 from the air bag container module (not shown) to reduce vibration/rattling in a conventional manner.

On sidewall 126, a single tab like protrusion 140 is shown in FIG. 2 that runs over most of the sidewall length. The guide tab 140 is supported by a series of gussets 141 that are anchored to the side wall 126 between window locations. The guide tab 140 is located just below the flange 108 and above the windows 150 to form a slot 142 therebetween. The slot has a height measured between the guide tab 140 and flange 108 that is approximately equal to the thickness of the edge of the aperture 51 in the instrument panel substrate 50. The guide tab 140 and slot 142 serve to engage the edge of the aperture 51 during insertion of air bag chute 100 therein. Following the completion of insertion of air bag chute 100 into the aperture 51, the tab 140 functions to retain the air bag chute in aperture 51.

Other features pertinent to the present invention include the support gussets 160 shown in FIGS. 2 and 3. These support gussets are located on the outer sides of both side walls 127 and 129 to provide a degree of rigidity between the flange 108 and the sidewalls. Notches 162 are provided just below the flange 108 to have a size that corresponds to the thickness of and to engage the edges 55 and 56 of aperture 51 (FIG. 4) when air bag chute 100 is inserted therein.

Figure 4:
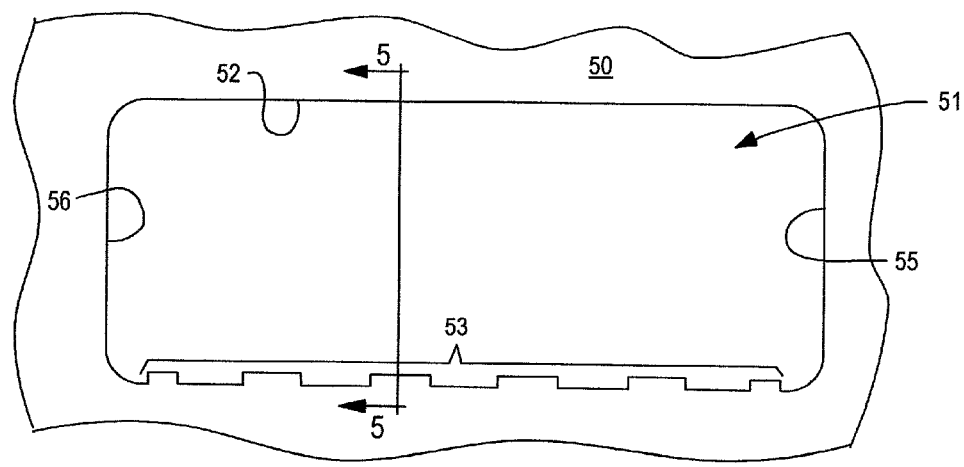
FIG. 4 is a top plan view of the instrument panel substrate aperture into which the air bag chute of the present invention is inserted.

On the passenger side of air bag chute 100, shown in FIG. 3, a series of indented depressions 144 are formed in sidewall 128 in correspondence to the locations of tab like protrusions 53 extending from the edge of the aperture 51 in the instrument panel substrate 50 (FIG. 4). The depressions 144 are spaced apart so that they are separated by the window openings 154. This separation and location serves to retain the strength integrity of the sidewall 128 that may be compromised if the depressions 144 were to be located above the windows or were formed as a single continuous depression that extended over the windows 154.

Figure 5:
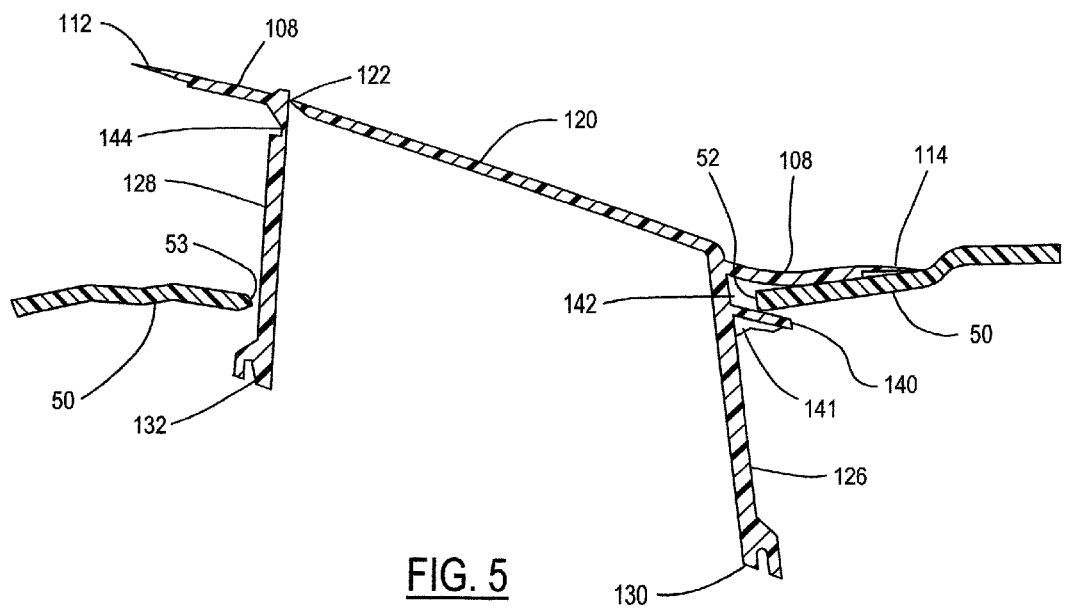
FIG. 5 is a cross-sectional view of the air bag chute of the present invention taken along lines 5-5 in FIGS. 2-4 as it is being inserted into the instrument panel aperture and having one side initially engaged with the instrument panel substrate.

FIG. 5 illustrates how guide tab 140 and slot 142 of air bag chute 100 (taken along section lines 5-5 in FIGS. 2, 3 and 4) are used to engage edge 52 of aperture 50 during the initial part of the installation of air bag chute 100 therein. As can be seen, the lower chute skirt made up of sidewalls 126, 127, 128 and 129 is inserted into aperture 51 from above. As the forward portion of flange 108 containing tapered edge 114 is pressed against substrate 50, flange 108 is flexed upwards to allow edge 52 to slide into slot 142. Once edge 52 is fully engaged in slot 142, the passenger side of chute 100 is depressed into aperture 51. During that depression, gussets 160 are flexibly deformed inwards by side edges 55 and 56 until slots 162 engage. When slots 162 engage, gussets 160 are restored to their normal shapes. Further depression of chute 100 into aperture 51 allows depression 144 in sidewall 128 to engage tab protrusions 53 (see FIG. 6). At that point, air bag chute 100 is fully inserted into aperture 51 and secured in instrument panel substrate 50.

Figure 6:
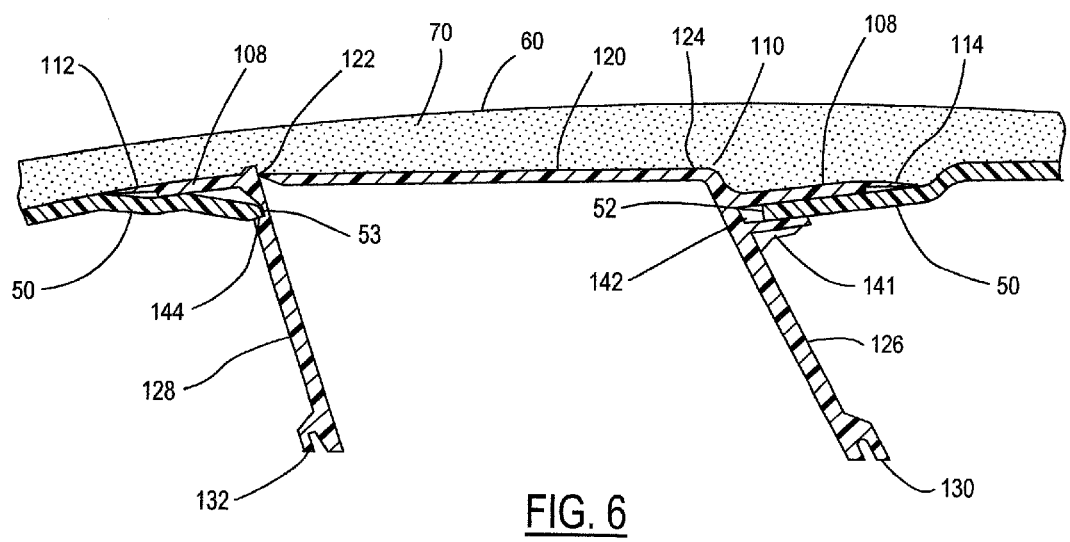
FIG. 6 is a cross-sectional plan view of the air bag chute structure of FIG. 5 after it has been fully installed in the instrument panel substrate and subjected to the foam-in-place process.

In FIG. 6, a cross-sectional view of air bag chute structure 110 is shown taken along section lines 5-5 in FIGS. 2, 3 and 4, fully mounted on instrument panel substrate 50. The drawing illustrates air bag chute 100 in its finished condition mounted on the instrument panel 50 and covered with a foam interlayer 70 and a "class A" outer skin 60. It should be noted that many choices of outer skin layers or laminations can be used that are both conventional and yet to be invented. The actual materials used for the outer skin are not pertinent to the present invention except for the property of containing the initially injected foam in its liquid form, and later the foam flow back as it approaches its solid form during the foam-in-place process described above.

The air bag chute structure 110 is inserted into the aperture 51 defined in the instrument panel substrate 50. Guide tab 140 is located under flange 108 and extends from the outside of side wall 126 towards the tapered outer edge 114. Slot 142 is shown formed between guide tab 140 and the underside of flange 108 below and in the vicinity of hinge 124. Slot 142 is only slightly larger than the thickness of the substrate 50, at that location, and allows the chute structure to positively engage edge 52 of aperture 51. When installed, the tapered edge 114 of flange 108 sealingly engages the upper surface of substrate 50.

At the rear passenger side of the air bag chute structure 110, depressions 144 formed in sidewall 128 below and in the vicinity of the leading edge 122 of the support door panel 120 are shown engaging edge tab protrusion 53 of aperture 51. Tapered edge 112 of flange 108 sealingly engages the upper surface of substrate 50. Although not shown, the other tapered edges 116 and 118 of flange 108 also sealingly engage the upper surface of substrate 50. When installed, as shown in FIG. 6, tapered edges 112, 114, 116, 118 provide a complete seal of the opening 52 in substrate 50 without the requirement for masking tape or other add-on sealers.

An alternative embodiment of the present invention (not shown) duplicates the retention mechanism pictured on the passenger side of the air bag chute structure 110 on the forward or windshield. Instead of using a guide tab 140 below the underside of flange 108 in the vicinity of hinge 124 to define slot 142, depressions 144 are formed in sidewall 126 below and in the vicinity of hinge 124. Edge tab protrusions 53 of aperture 51 on the passenger side of the substrate aperture are duplicated on the forward side of the substrate aperture to accommodate and engage with the depressions on that side of the air bag chute structure 110. Installation of this embodiment allows for a straight or angled insertion of the air bag chute structure 110 into the aperture 51. Retention is completed when the tab protrusions 53 engage the depressions 144 in both side walls 126 and 128.

It can be seen from the drawings and accompanying explanation, that the present inventive concept is a unique improvement over conventional air bag deployment support structures and methods of installation. And while the embodiments described here are preferred, they shall not be considered to be a restriction on the scope of the claims set forth below.

We claim:

1. An air bag chute structure used in an air bag deployment system of an automotive vehicle:
    said structure configured to be installed in an aperture formed in an instrument panel substrate;
    said structure containing an upper portion that contains a deployment door and a flange with flexible edges surrounding said structure;
    a lower portion below said flange having a plurality of sidewalls defining the path for air bag deployment;

said side walls contain means for engaging with the edges of said aperture to hold said structure to said substrate when said structure is inserted therein;

said structure further including a set of gussets supporting said flange against corresponding sidewalls, wherein said gussets are formed on second and third ones of said sidewalls and are sized to interfere with and be flexibly deformed by portions of the edges of said aperture when said structure is inserted therein.

2. An air bag chute structure as in claim 1, wherein said means for engaging includes at least one slot formed beneath said flange on a first one of said sidewalls to engage a portion of the edge of said substrate surrounding said aperture and retain said air bag chute structure to said substrate.

3. An air bag chute structure as in claim 2, wherein said at least one slot is formed by a tab extending from the outer side of said first one of said side walls and having its upper surface separated from the lower surface of said flange by a distance that is approximately equal to the thickness of said edge.

4. An air bag chute structure as in claim 1, wherein said means for engaging includes a set of depressions in a fourth one of said side walls for accepting and retaining a set of spaced apart tabs, protruding from said substrate into said aperture, when said structure is inserted full into said aperture.

5. An air bag chute structure as in claim 4, wherein said set of depressions is formed by individual depressions in said fourth one of said side walls immediately below said flange in correspondence to the size and location of said tabs.

6. An air bag chute support structure as in claim 1, wherein said gussets contain notches on their outer edges immediately below said flange for accepting and retaining said edges of said aperture when said structure is inserted therein, and for allowing said gussets to resume their normally undeformed characteristics.

7. An air bag chute structure as in claim 1, wherein said flange forms a seal with respect to said upper surface of said substrate and prevents the migration of liquid foam into said aperture during a foam-in-place process.

8. An air bag chute structure as in claim 7, wherein said upper portion of said structure is continuous and without apertures, gaps and holes that are open to the lower portion thereof.

9. An air bag chute structure as in claim 1, wherein said means for engaging includes a set of depressions in at least one of said side walls for accepting and retaining a set of spaced apart tabs, protruding from said substrate into said aperture, when said structure is inserted full into said aperture.

10. An air bag chute structure as in claim 9, wherein said set of depressions is formed by individual depressions in said at least one of said side walls immediately below said flange in correspondence to the size and location of said tabs.

11. An air bag chute structure of an air bag deployment system in an automotive vehicle, wherein the chute structure is configured to be installed in an aperture formed in an instrument panel substrate, wherein the instrument panel substrate includes a set of spaced apart tabs protruding into the aperture, the chute structure comprising:

an upper portion having a deployment door and a flange with flexible edges for engaging an upper surface of the instrument panel substrate; and a lower portion below the flange having a plurality of side walls defining a path for air bag deployment, wherein the side walls engage with edges of the aperture to hold the chute structure to the substrate, wherein the side walls include first and second major side walls and first and second minor side walls;

wherein the first major side wall includes a lengthwise tab extending from the outer side of the first major side wall with an upper surface separated from the lower surface of the flange by a distance that is approximately equal to the thickness of the edge in order to form a slot for receiving a portion of the edge of the substrate;

wherein the second major side wall includes a set of depressions for receiving the set of spaced apart tabs when the chute structure is inserted fully into the aperture; and wherein a set of gussets is formed on the first and second minor side walls having notches formed at the lower surface of the flange to receive another portion of the edge of the substrate, wherein the gussets are flexibly deformed by the edge of the aperture when the chute structure is being inserted therein.

* * * * *